(12) United States Patent
Kobayashi

(10) Patent No.: US 6,403,683 B1
(45) Date of Patent: Jun. 11, 2002

(54) POLYCARBONATE RESIN COMPOSITION AND MOLDED ARTICLE

(75) Inventor: Hiroaki Kobayashi, Chiyoda-ku (JP)

(73) Assignee: Teijin Chemicals Ltd, Tokyo (JP)

( * ) Notice: Subject to any disclaimer, the term of this patent is extended or adjusted under 35 U.S.C. 154(b) by 0 days.

(21) Appl. No.: 09/530,186

(22) PCT Filed: Aug. 26, 1999

(86) PCT No.: PCT/JP99/04611

§ 371 (c)(1),
(2), (4) Date: Apr. 26, 2000

(87) PCT Pub. No.: WO00/12629

PCT Pub. Date: Mar. 9, 2000

(30) Foreign Application Priority Data

Aug. 28, 1998 (JP) .......................................... 10-243012
Oct. 30, 1998 (JP) .......................................... 10-310374

(51) Int. Cl.[7] .............................. C08J 5/15; C08G 64/00
(52) U.S. Cl. ...................... 524/115; 528/196; 528/198
(58) Field of Search .......................... 524/115; 528/196, 528/198

(56) References Cited

U.S. PATENT DOCUMENTS

| 2,891,920 A | 6/1959 | Hyde et al. |
| 3,294,725 A | 12/1966 | Findlay et al. |
| 5,061,745 A | 10/1991 | Wittmann et al. |
| 5,204,394 A | 4/1993 | Gosens et al. |
| 5,723,526 A | 3/1998 | Nagasawa |

FOREIGN PATENT DOCUMENTS

| EP | 909790 | 4/1999 |
| JP | A232154 | 2/1990 |
| JP | A2115262 | 4/1990 |
| JP | 6240127 | 8/1994 |
| JP | A7126510 | 5/1995 |
| JP | A10101920 | 4/1998 |
| JP | A10147701 | 6/1998 |
| JP | A10237291 | 9/1998 |
| JP | A10338805 | 12/1998 |
| JP | A11130954 | 5/1999 |
| JP | A11269368 | 10/1999 |
| JP | A11310695 | 11/1999 |
| JP | A11315200 | 11/1999 |
| WO | WO9911713 | 3/1999 |

*Primary Examiner*—Terressa M. Boykin
(74) *Attorney, Agent, or Firm*—Sherman & Shalloway

(57) ABSTRACT

According to the present invention, there are provided a polycarbonate resin composition which comprises (A) 40 to 92 wt % of an aromatic polycarbonate resin (component "a"), (B) 5 to 40 wt % of a styrene-based resin (component "b"), (C) 3 to 20 wt % of a phosphate-based flame retardant (component "c"), and (D) 0.1 to 30 parts by weight of a silicate filler (component "d") based on 100 parts by weight of the total of the components "a", "b" and "c", and which has a chlorine compound content in terms of chlorine atoms of 100 ppm or less as well as a molded product thereof.

The resin composition of the present invention can provide a molded product having excellent resistance to wet heat and flame retardancy.

21 Claims, No Drawings

POLYCARBONATE RESIN COMPOSITION AND MOLDED ARTICLE

DETAILED DESCRIPTION OF THE INVENTION

1. Field of the Invention

The present invention relates to a polycarbonate resin composition having excellent resistance to wet heat and to a molded product of the same. More specifically, it relates to a polycarbonate resin composition which is excellent in resistance to wet heat and further in flame retardancy and to a molded product of the same.

2. Related Art

Polycarbonate resins are widely used in the industrial field because they have excellent mechanical properties and thermal properties. However, since they are inferior in workability and moldability, a large number of polymer alloys of the polycarbonate resins and other thermoplastic resins have been developed. Out of these, polymer alloys of the polycarbonate resins and styrene-based resins typified by ABS resin are widely used in the fields of automobiles, OA equipment, electronic and electric appliances, and the like. To meet recent strong demand for flame retardant resin molded products mainly from the fields of OA equipment and home electric appliances, a large number of studies on the flame retardation of polymer alloys of the polycarbonate resins and ABS resin are under way.

Heretofore, a halogen-based flame retardant having bromine and a flame retardant aid such as antimony trioxide have generally been used in combination in the above polymer alloys. However, to cope with such a problem as the generation of a harmful substance at the time of combustion, studies on flame retardation without using a halogen-based compound having bromine are now being made energetically. For example, there are now proposed a method of blending triphenyl phosphate and polytetrafluoroethylene having fibril formability into a polymer alloy of a polycarbonate resin and ABS resin (JP-A 2-32154) (the term "JP-A" as used herein means an "unexamined published Japanese patent application"), a method of blending a phosphate-based oligomer which is a condensation phosphoric ester (JP-A 2-115262), a method of blending a specific inorganic filler and a specific impact modifier (JP-A 7-126510), and the like. Meanwhile, great importance is being attached to performance retainability in long-term use from the viewpoints of product safety, a reduction in the load of environment due to the extension of the service life of a product and product quality warranted by manufacturers.

However, a polycarbonate resin composition comprising a phosphate-based flame retardant has such a problem that when it is used for a long time, the blended phosphate-based flame retardant is hydrolyzed and the hydrolyzed product promotes the hydrolysis of the carbonate bonds of a polycarbonate resin, thereby greatly reducing impact strength and the like. That is, it has been desired to improve the wet heat resistance of a resin composition prepared by blending a phosphate-based flame retardant into a polymer alloy of a polycarbonate resin and ABS resin and a quick solution to this has been awaited.

SUMMARY OF THE INVENTION

It is a first object of the present invention to provide a polycarbonate resin composition prepared by blending a phosphate-based flame retardant into a polymer alloy of a polycarbonate resin and a styrene-based resin, which has excellent resistance to wet heat.

It is a second object of the present invention to provide a polycarbonate resin composition prepared by blending a phosphate-based flame retardant and polytetrafluoroethylene having fibril formability as a drip-proof agent into a polymer alloy of a polycarbonate resin and a styrene-based resin, which is excellent in resistance to wet heat, impact resistance, flame retardancy and coloring.

It is a third object of the present invention to provide a polycarbonate resin molded article which attains V-0 rating in an UL standard 94V flammability test and rarely experiences reductions in impact strength and molecular weight under such conditions as relatively high temperature and high humidity.

The inventor of the present invention conducted studies to attain the above objects of the present invention and found that a polycarbonate resin composition having excellent flame retardancy and also long-term resistance to hydrolysis (resistance to wet heat) is obtained by controlling the content of a chlorine compound in the composition below a specific value and blending a specific type of inorganic filler when a phosphate-based flame retardant is blended into a polymer alloy of a polycarbonate resin and a styrene-based resin. Thus, the present invention was accomplished based on this finding.

According to the present invention, firstly, the above objects and advantages of the present invention are attained by a polycarbonate resin composition (may be referred to as "resin composition-I" hereinafter) which comprises:

(A) 40 to 92 wt % of an aromatic polycarbonate resin (component "a");

(B) 5 to 40 wt % of a styrene-based resin (component "b");

(C) 3 to 20 wt % of a phosphate-based flame retardant (component "c"); and (D) 0.1 to 30 parts by weight of a silicate filler (component "d") based on 100 parts by weight of the total of the components "a", "b" and "c", and which has a chlorine compound content in terms of chlorine atoms of 100 ppm or less.

Secondly, the above objects and advantages of the present invention are attained by a polycarbonate resin composition (may be referred to as "resin composition-II" hereinafter) which comprises:

(A) 40 to 92 wt % of an aromatic polycarbonate resin (component "a");

(B) 5 to 40 wt % of a styrene-based resin (component "b");

(C) 3 to 20 wt % of a phosphate-based flame retardant (component "c");

(D) 0.1 to 30 parts by weight of a silicate filler (component "d") based on 100 parts by weight of the total of the components "a", "b" and "c";

(E) 0.1 to 2 parts by weight of polytetrafluoroethylene (component "e") having fibril formability based on 100 parts by weight of the total of the components "a", "b" and "c"; and (F) 1 to 10 parts by weight of a (meth)acrylate-based core-shell graft copolymer (component "f-1") based on 100 parts by weight of the total of the components "a", "b" and "c", and which has a chlorine compound content in terms of chlorine atoms of 100 ppm or less.

The term "resin composition" in the present invention generally refers to both the resin composition-I and the resin composition-II.

The present invention provides a resin composition which has improved resistance to wet heat (resistance to hydrolysis) and experiences an extremely small reduction in impact strength during its long-term use by controlling the content of a chlorine compound to 100 ppm or less in terms of chlorine atoms and blending a specific amount of a silicate filler into a resin composition which comprises a polycarbonate resin, styrene-based;resin and phosphate-based flame retardant.

The polycarbonate resin composition of the present invention will be described in detail hereinunder.

A description is first given of each of the components constituting the resin composition.

(A) Polycarbonate Resin (Component "a")

The polycarbonate resin which is the component "a" in the present invention is a polycarbonate resin obtained by reacting a diphenol with a carbonate precursor, namely, an aromatic polycarbonate resin. Typical examples of the diphenol used herein include 2,2-bis(4-hydroxyphenyl) propane (to be referred to as "bisphenol A" hereinafter), 1,1-bis(4-hydroxyphenyl)ethane, 1,1-bis(4-hydroxyphenyl) cyclohexane, 2,2-bis(4-hydroxy-3,5-dimethylphenyl) propane, 2,2-bis(4-hydroxy-3-methylphenyl)propane, bis(4-hydroxyphenyl)sulfide, bis(4-hydroxyphenyl)sulfone and the like. The diphenol is preferably a 2,2-bis(4-hydroxyphenyl)alkane, particularly preferably bisphenol A. The carbonate precursor is a carbonyl halide, carbonic acid diester, bishaloformate or the like. Illustrative examples of the carbonate precursor include phosgene, diphenyl carbonate, dibischloroformates of diphenols and the like. For the production of a polycarbonate resin by reacting the above diphenol with the carbonate precursor, the diphenols may be used alone or in combination of two or more and the polycarbonate resin may be a mixture of two or more polycarbonate resins.

The molecular weight of the polycarbonate resin is generally 10,000 to 40,000, preferably 12,000 to 30,000 in terms of viscosity average molecular weight. The viscosity average molecular weight (M) is obtained by inserting a specific viscosity ($\eta sp$) obtained from a solution containing 0.7 g of a polycarbonate resin dissolved in 100 ml of methylene chloride at 20° C. into the following equation.

$$\eta sp/C = [\eta] + 0.45 \times [\eta]^2 C$$

$[\eta] = 1.23 \times 10^{-4} M^{0.83}$ ($[\eta]$ represents an intrinsic viscosity and C represents a polymer concentration)

A brief description is given of an interfacial polymerization method (solution method) for the production of the polycarbonate resin. In the interfacial polymerization method in which phosgene is used as the carbonate precursor, a reaction is generally carried out in the presence of an acid binder and an organic solvent. Examples of the acid binder include alkali metal hydroxides such as sodium hydroxide and potassium hydroxide and amine compounds such as pyridine. Examples of the organic solvent include hydrocarbon halides such as methylene chloride and chlorobenzene. A catalyst such as a tertiary amine or quaternary ammonium salt may be used to promote the reaction. It is desirable to use a terminal capping agent such as phenol, an alkyl-substituted phenol exemplified by p-tert-butylphenol or aralkyl-substituted phenol exemplified by 4-(2-phenylisopropyl)phenol as a molecular weight modifier. The reaction temperature is generally 0 to 40° C., the reaction time is 10 minutes to 5 hours, and pH during the reaction is preferably maintained at 9 or more. All of the molecular chain terminals thus obtained do not need to have a structure derived from the terminal capping agent.

An ester interchange reaction (melt polymerization) using a carbonic acid diester as the carbonate precursor is carried out by stirring a predetermined amount of a diphenol component and a branching agent as required together with a carbonic acid diester under heating in an inert gas atmosphere and distilling the formed alcohol or phenol. Although the reaction temperature differs according to the boiling point of the formed alcohol or phenol, it is generally in the range of 120 to 350° C. The reaction is started at a reduced pressure and completed while the formed alcohol or phenol is distilled. To promote the reaction, a catalyst used for a known ester exchange reaction, such as an alkali metal compound or nitrogen-containing basic compound may be used. Illustrative examples of the carbonic acid diester used in the above ester exchange reaction include diphenyl carbonate, dinaphthyl carbonate, bis(diphenyl)carbonate, dimethyl carbonate, diethyl carbonate, dibutyl carbonate and the like. Out of these, diphenyl carbonate is particularly preferred. It is preferred that a terminal capping agent such as diphenyl carbonate or methyl(2-15 phenyloxycarbonyloxy)benzene carboxylate should be added in the initial stage or intermediate stage of the reaction and a conventionally known catalyst deactivator should be added right before the end of the reaction.

The polycarbonate resin which is the component "a" used in the present invention may be produced by either one of interfacial polymerization and melt polymerization. However, the present invention is suited when a polycarbonate resin produced by interfacial polymerization is used as the component "a". The reason for this is as follows. As described above, a chlorine compound such as a solvent and a modified product thereof, catalyst, catalyst deactivator and modified products thereof and a reaction by-product remain in a polycarbonate resin produced by interfacial polymerization in no small quantities. The residual chlorine compound is removed to some degree by purification but it is inevitable that a trace amount of the chlorine compound remains in the polycarbonate resin. The present inventor considered that a chlorine compound mainly derived from a polycarbonate resin and a phosphoric ester (component "c") as a flame retardant contained in the composition interact with each other to cause the hydrolysis of the composition. However, the present invention makes it possible to greatly suppress the hydrolysis and improve resistance to wet heat by further blending a silicate filler even when a chlorine compound is existent in some measure due to a polycarbonate resin containing the residual chlorine compound. To suppress the content of a chlorine compound in the composition so as to further improve resistance to wet heat, the content of the chlorine compound in the polycarbonate resin as the main ingredient was reduced. As a result, it was found that the content of the chlorine compound in the resin composition should be reduced to 100 ppm or less, preferably 90 ppm or less, particularly preferably 50 ppm or less in terms of chlorine atoms.

The content of the chlorine compound in the composition of the present invention may be maintained at the above range and the chlorine compound may be derived from any component. As described above, however, the polycarbonate resin (component "a") is the major ingredient of the resin composition of the present invention and has the residual chlorine compound due to the production method of the resin composition. Therefore, a polycarbonate resin having a small content of a chlorine compound should be used.

The preferable content of a chlorine compound in the polycarbonate resin used which depends on the proportion of the polycarbonate resin (component "a") to the composition of the present invention and the content of a chlorine compound in other components is 100 ppm or less, preferably 90 ppm or less, particularly preferably 20 ppm or less in terms of chlorine atoms.

A polycarbonate resin having a low content of a chlorine compound can be obtained by conventionally known methods such as one in which a polycarbonate resin is treated with acetone, one in which elimination of the chlorine compound is carried out by forcedly injecting water into an intermediate portion of a vented extruder to pelletize polycarbonate resin powders, one in which a polycarbonate resin solution is precipitated with a none solvent, one in which a dry treatment is intensified, and the like.

Further, a method of producing polycarbonate resin granules from an organic solvent solution of a polycarbonate resin by continuously supplying the organic solvent solution of the polycarbonate resin into a vessel containing polycarbonate resin granules and hot water under agitation and evaporating the solvent, in which the temperature in the vessel is maintained at $T_1(°C.)$ or $T_2(°C.)$ shown in the following equation, the agitation speed is 60 to 100 rpm, and the agitation capability is 5 to 10 kw/h·m³, can be preferably used to obtain a polycarbonate resin which has a low content of the residual chlorine compound, a low content of powders and excellent filtrability and dryability.

$$0.0018 \times M_1 + 37 \leq T_1(°C.) \leq 0.001 \times M_1 + 42$$

($M_1$: viscosity average molecular weight of 10,000 to 20,000)

$$0.0007 \times M_2 + 59 \leq T_2(° C.) \leq 0.0007 \times M_2 + 64$$

($M_2$: viscosity average molecular

The content of chlorine atoms in the polycarbonate resin composition of the present invention is measured by a fluorescence X-ray analytical method using the PIX-2000 fully automatic fluorescence X-ray analyzer of Rikagaku Denki Kogyo Co., Ltd.

(B) Styrene-based Resin (Component "b")

The styrene-based resin used as the component "b" in the present invention contains 20 wt % or more, preferably 25 wt % of a styrene-based monomer of styrene, α-methylstyrene or vinyltoluene based on 100 wt % of the resin. Therefore, the styrene-based resin is a homopolymer of a styrene-based monomer, a copolymer of styrene-based monomers, or a copolymer of a styrene monomer and a vinyl monomer such as acrylonitrile and methyl methacrylate. Further, the styrene-based resin may be a polymer obtained by graft polymerizing a rubber component such as a diene-based rubber such as polybutadiene, ethylene.propylene-based rubber, acrylic rubber or composite rubber: having such a structure that a polyorganosiloxane component and a poly(meth)alkyl acrylate component are entangled with each other so that they cannot be separated from each other with a styrene-based monomer, or a styrene-based monomer and a vinyl monomer. Illustrative examples of the styrene-based resin include resins such as polystyrene, high-impact polystyrene (HIPS), acrylonitrile.styrene copolymer (AS resin) acrylonitrile.butadiene.styrene copolymer (ABS resin), methyl methacrylate.butadiene.styrene copolymer (MBS resin), methyl methacrylate.acrylonitrile.butadiene.styrene copolymer (MABS resin), acrylonitrile.acrylic rubber.styrene copolymer (AAS resin) and acrylonitrile.ethylene propylene-based rubber.styrene copolymer (AES resin); and mixtures thereof. A styrene-based monomer component is contained in the copolymer or mixture thereof in an amount of 20 wt % or more based on 100 wt % of the styrene-based resin. The polymers may be produced by bulk polymerization, suspension polymerization, emulsion polymerization, bulk-suspension polymerization, and copolymerization may be carried out in one stage or multiple stages.

Out of these, the component "b" of the present invention is preferably polystyrene, high-impact polystyrene (HIPS), acrylonitrile.styrene copolymer (AS resin) or acrylonitrile.butadiene.styrene copolymer (ABS resin), the most preferably ABS resin from the viewpoint of impact resistance. Further, resins produced by bulk polymerization are preferably used because they can improve resistance to et heat. These components "b" may be used alone or in admixture of two or more.

ABS resin as the component "b" of the present invention is a thermoplastic graft copolymer which is obtained by graft polymerizing a diene-based rubber component with a vinyl cyanide compound and an aromatic vinyl compound and usually forms a mixture with other polymer by-produced during the graft polymerization of AS resin or the like. The ABS resin mixed with an AS resin which has been polymerized separate from the ABS resin is widely used for industrial purposes. The diene-based rubber component forming the ABS resin is a rubber having a glass transition point of 10° C. or less, such as polybutadiene, polyisoprene or styrene-butadiene copolymer and preferably used in an amount of 5 to 75 wt % based on 100 wt % of the ABS resin component. The vinyl cyanide compound to be graft polymerized with the diene-based rubber component is acrylonitrile, methacrylonitrile or the like. The aromatic vinyl compound to be graft polymerized with the diene-based rubber component is styrene, α-methylstyrene or nucleus-substituted styrene. As for the contents of the vinyl cyanide compound and the aromatic vinyl compound, the vinyl cyanide compound is contained in an amount of 5 to 50 wt % and the aromatic vinyl compound is contained in an amount of 50 to 95 wt % based on 100 wt % of the total of the vinyl cyanide compound and the aromatic vinyl compound. Methyl acrylate, methyl methacrylate, ethyl acrylate, maleic anhydride or N-substituted maleimide may be mixed and should be contained an amount of 15 wt % or less in the component "b".

ABS resin may be produced by any one of bulk polymerization, suspension polymerization and emulsion polymerization. As described above, ABS resin produced by bulk polymerization is preferred because it can improve resistance to wet heat well. The reason for this is yet to be elucidated completely but there is conceivable a possibility that the metal salt component of an emulsifier used for emulsion polymerization or suspension polymerization exerts a direct influence upon hydrolysis caused by a phosphoric ester or that the metal salt component acts on a chlorine compound remaining in the polycarbonate resin composition to influence hydrolysis.

It has been found from studies conducted by the present inventor that when a styrene-based resin (especially ABS resin) containing acrylonitrile as a monomer constituting unit is the component "b", a resin having a small content of acrylonitrile monomer remaining in the resin is preferred. That is, it has been discovered that when an acrylonitrile monomer derived from the component "b" is contained in the resin composition of the present invention in an amount of more than 50 ppm, it exerts an undesired influence upon the wet heat resistance of the resin composition. The reason for this is unknown but it is presumed that the acrylonitrile monomer acts on a phosphoric ester (component "c") or a chlorine compound contained in the resin to influence the hydrolysis of the polycarbonate resin.

The preferable content of the acrylonitrile monomer in the resin composition of the present invention is 50 ppm or less, preferably 30 ppm or less, the most preferably 20 ppm or less.

In order to reduce the content of the acrylonitrile monomer in the resin composition to the above level, it is the most simplest means to use a resin having a small content of an acrylonitrile monomer as the styrene-based resin (especially ABS resin) containing acrylonitrile as a monomer constituent unit. The preferable content of the acrylonitrile monomer in the component "b", which is mainly affected by the amount of the component "b" in the resin composition, is preferably 200 ppm or less, more preferably 100 ppm or less, particularly preferably 50 ppm or less. When the amount of the residual acrylonitrile monomer satisfies the above range, the content of the acrylonitrile monomer in the resin composition can be controlled to the above range and more excellent resistance to wet heat can be obtained. Therefore, the styrene-based resin (especially ABS resin) containing acrylonitrile as a monomer constituent unit is preferably a resin having an acrylonitrile monomer content of 200 ppm or less, more preferably 100 ppm or less, particularly preferably 50 ppm or less and produced by bulk polymerization.

(C) Phosphate-based Flame Retardant (Component "c")

The resin composition of the present invention contains a phosphate-based flame retardant to achieve high flame retardancy without containing a halogen-containing flame retardant. This component "c" may be a phosphate-based flame retardant used as a halogen-free flame retardant for a polycarbonate resin.

A preferred phosphate-based flame retardant is represented by the following formula (1):

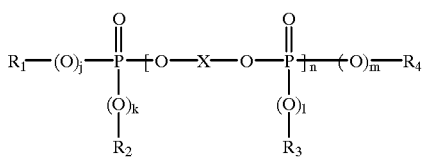

(1)

wherein X is the residual group of an aromatic dihydroxy compound, J, k, l and m are each independently 0 or 1, n is 0 or an integer of 1 to 5, and $R_1$, $R_2$, $R_3$ and $R_4$ are each independently the residual group of an aromatic monohydroxy compound.

In the above formula (1), j, k, l and m are each independently 0 or 1, preferably all 1. n is 0 or an integer of 1 to 5, preferably 0 or an integer of 1 to 3, particularly preferably 0 or 1. n is generally given as the average value of a mixture of an "n" number of phosphates. Therefore, n is 0 to 5, preferably 0 to 3 as the average value. X is the residual group of an aromatic dihydroxy compound, and $R_1$, $R_2$, $R_3$ and $R_4$ are each independently the residual group of an aromatic monohydroxy compound. The residual group is a group obtained by removing two OH groups or one OH group from the dihydroxy compound or the monohydroxy compound. For example, the residual group of bisphenol A (X) is represented by the following formula.

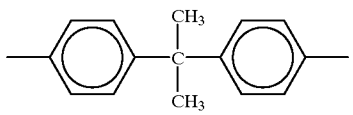

Examples of X include the residual groups of hydroquinone, resorcinol, bis(4-hydroxydiphenyl)methane, bisphenol A, dihydroxydiphenyl, dihydroxynaphthalene, bis (4-hydroxyphenyl)sulfone, bis(4-hydroxyphenyl)ketone and bis(4-hydroxyphenyl)sulfide. Out of these, X is preferably the residual group of hydroquinone, resorcinol or bisphenol A. Examples of $R_1$, $R_2$, $R_3$ and $R_4$ include the residual groups of phenol, cresol, xylenol, isopropylphenol, butylphenol and p-cumylphenol. Out of these, the residual groups of phenol, cresol and xylenol are preferred and the residual groups of phenol and xylenol are particularly preferred.

The phosphate-based flame retardant as the component "c" is preferably a monophosphate compound such as triphenyl phosphate or a condensed phosphoric ester such as resorcinol bis(dixylenylphosphate) because they have excellent flame retardancy and excellent flowability at the time of molding.

(D) Silicate Filler (Component "d")

The silicate filler as the component "d" in the present invention is an inorganic filler containing $SiO_2$ in an amount of 35 wt % or more, preferably 40 wt % or more in its chemical composition. Illustrative examples of the silicate filler include kaolin, talc, clay, pyrophylite, mica, montmorillonite, bentonite, wollastonite, sepiolite, xonotlite, natural silica, synthetic silica, glass fillers, zeolite, diatomaceous earth, halloysite, and mixtures thereof.

Out of these, talc, mica, wollastonite and mixtures thereof are preferred because they are finely dispersed in the resin composition of the present invention to increase the number of function points for suppressing hydrolysis and their effect of reinforcing a resin is also important to provide flame retardant. Talc is the most preferred.

Mica as the component "d" is preferably powdery with an average particle diameter of 1 to 80 µm to secure a reinforcing effect. Mica is a ground product of a silicate mineral containing aluminum, potassium, magnesium, sodium, iron and the like. Mica includes muscovite, phlogopite, biotite, artificial mica and the like. Any one of these may be used but muscovite having a high content of SiO2 is more preferred than phlogopite, biotite and artificial mica obtained by substituting the OH group of phlogopite by an F atom. Milling methods for the production of mica are a dry milling method in which a mica ore is ground with a dry mill and a wet milling method in which a mica ore is ground with a dry mill, water is added to the ground mica to prepare a slurry, and the slurry was then ground with a wet mill, dehydrated and dried. Although the dry milling method is more inexpensive and general, it is difficult to grind mica thinly and finely. Therefore, mica produced by the wet milling method is preferably used in the present invention.

The average particle diameter of mica measured by a microtrack laser diffraction method is preferably 1 to 80 µm. The average particle diameter is more preferably 2 to 50 µm. When the average particle diameter is 1 to 80 µm, a favorable effect is given to flame retardancy and excellent resistance to wet heat can be maintained because fine dispersion conditions in the resin are satisfied.

The thickness of mica observed by an electron microscope is 0.01 to 1 µm. The thickness is preferably 0.03 to 0.3

μm. Mica may be surface treated with a silane coupling agent or the like and granulated with a binder such as an epoxy-based, urethane-based or acryl-based binder. Illustrative examples of the mica include mica powders A-41, A-21 and A-11 manufactured by Yamaguchi Unmo Kogyosho Co., Ltd. They are available on the market.

Talc as the component "d" is preferably powdery with an average particle diameter of 0.5 to 20 μm to secure rigidity. Since talc is relatively thicker than mica, it is preferably smaller in size so that it is dispersed in the resin as finely as mica. The average particle diameter of talc is measured by a microtrack laser diffraction method.

Talc is not limited by the place of production and so on. It preferably has a high $SiO_2$ content, for example, 60 wt % or more. When talc has a high. $SiO_2$ content, the content of $Fe_2O_3$ which is an impurity is apt to become relatively low. Therefore, talc is advantageous in terms of color. A method of grinding a talc ore is not particularly limited and may be an axial-flow milling method, annular milling method, roll milling method, ball milling method, jet milling method, vessel rotary compression shear milling method or the like. Talc is preferably agglomerated from the viewpoint of handling properties. To produce agglomerated talc, such methods are available as one making use of deaeration and compression, one in which a binder resin is used for compression. The method making use of deaeration and compression is preferred because it is simple and prevents an unrequired binder resin component from being contained in the composition of the present invention.

Wollastonite as the component "d" is a natural white mineral having needle-like crystals mainly composed of calcium silicate and substantially represented by a chemical formula $CaSiO_3$. It generally contains $SiO_2$ in an amount of about 50 wt %, CaO in an amount of about 47 wt % and others including $Fe_2O_3$ and $Al_2O_3$ and has a specific gravity of about 2.9.

Preferably, wollastonite has such a particle size distribution that particles having a size of 3 μm or more account for 75% or more and particles having a size of 10 μm or more account for 5% or less and an aspect ratio L/D (length/diameter) of 3 or more, particularly preferably 8 or more. When particles having a size of 3 μm or more account for 75% or more and particles having a size of 10 μm or more account for 5% or less in the particle size distribution, the wollastonite has a satisfactory reinforcing effect to improve flame retardancy easily and is finely dispersed in the resin to obtain excellent resistance to wet heat. When the aspect ratio is 8 or more, a satisfactory reinforcing effect is obtained. When work environment is taken into consideration, wollastonite having an aspect ratio of 50 or less, preferably 40 or less are advantageous. Wollastonite may be surface treated with an ordinary surface treatment agent, for example, a coupling agent such as a silane-based coupling agent or titanate-based coupling agent.

The resin composition-I of the present invention comprises four components "a", "b", "c" and "d" as essential ingredients. The amounts of these essential ingredients of the resin composition-I will be described below. The amounts of the components "a", "b" and "c" in the resin composition are expressed based on the total weight of the three components. The component "a" is; contained in an amount of 40 to 92 wt %, the component "b" in an amount of 5 to 40 wt % and the component "c" in an amount of 3 to 20 wt % based on 100 wt % of the total of the three components. When the component "a" is contained in an amount of less than 40 wt % or the component "b" is contained in an amount of more than 40 wt %, heat resistance (especially deflection temperature under load) and mechanical strength lower. When the component "a" is contained in an amount of more than 92 wt % or the component "b" is contained in an amount of less than 5 wt %, flowability and moldability lower. Further, when the component "c" is contained in an amount of less than 3 wt %, sufficient flame retardancy cannot be obtained and when the component "c" is contained in an amount of more than 20 wt %, mechanical strength and heat resistance (especially deflection temperature under load) markedly lower and resistance to wet heat greatly lowers.

Preferably, the component "a" is contained in an amount of 50 to 88 wt %, the component "b" in an amount of 7 to 35 wt % and the component "c" in an amount of 5 to 15 wt %.

The amount of the component "d" in the present invention is 0.1 to 30 parts by weight, preferably 0.5 to 20 parts by weight based on 100 parts by weight of the total of the components "a", "b" and "c". When the amount of the component "d" is smaller than 0.1 part by weight, the component "d" has no effect of improving resistance to wet heat and when the amount is larger than 30 parts by weight, its effect of improving resistance to wet heat is saturated, impact strength lowers and the surface appearance of the obtained molded product worsens.

The resin composition-I of the present invention may contain polytetrafluoroethylene (component "e") having fibril formability to further improve flame retardancy. The polytetrafluoroethylene having fibril formability is classified into type 3 according to ASTM standards. The polytetrafluoroethylene having fibril formability has the property of preventing the melt dripping of a test piece at the time of an UL standard vertical flammability test and are available on the market under the trade name of Teflon 6J from Dupont-Mitsui Florochemicals Co., Ltd. or Polyfureon from Daikin Industries Ltd. The amount of the polytetrafluoroethylene having fibril formability is preferably 0.1 to 2 parts by weight based on 100 parts by weight of the total of the three components "a", "b" and "c". When the amount of the polytetrafluoroethylene is smaller than 0.1 part by weight, satisfactory melt dripping preventing capability is hardly obtained and when the amount is larger than 2 parts, the appearance of the obtained molded product worsens. The amount of the component "e" is particularly preferably 0.1 to 1 part by weight.

The polytetrafluoroethylene may be used in the form of an aqueous emulsion or dispersion in addition to a general solid form. Since a dispersant component easily exerts a bad influence upon resistance to wet heat, the polytetrafluoroethylene in a solid form is preferred.

An agglomerated mixture of an emulsion of the polytetrafluoroethylene having fibril formability and an emulsion of a vinyl-based polymer is also preferred to improve dispersibility in the resin and to obtain an excellent appearance and mechanical properties.

Examples of the vinyl-based polymer include polypropylene, polyethylene, polystyrene, HIPS, AS resin, ABS resin, MBS resin, MABS resin, AAS resin, polymethyl (meth)acrylate, styrene-butadiene block copolymer and hydrogenated copolymer thereof, styrene-isoprene block copolymer and hydrogenated copolymer thereof, acrylonitrile-butadiene copolymer, ethylene-propylene random copolymer and block copolymer, ethylene-butene random copolymer and block copolymer, ethylene-α-olefin copolymer, ethylene-unsaturated carboxylic ester copolymer such as ethylene-butyl acrylate, acrylic ester-butadiene copolymer such as butyl acrylate-butadiene, rubber-like polymer such as polyalkyl (meth)acrylate, composite rubber containing polyorganosiloxane and polyalkyl (meth) acrylate, copolymer obtained by graft copolymerizing the composite rubber with a vinyl-based monomer such as styrene, acrylonitrile or polyalkyl methacrylate, and the like.

Out of these, polystyrene, HIPS, ABS resin, AAS resin, polymethyl methacrylate, composite rubber containing polyorganosiloxane and polyalkyl (meth)acrylate, and copolymer obtained by graft copolymerizing the composite rubber with a vinyl-based monomer such as styrene, acrylonitrile or polyalkyl methacrylate are preferred, and a polymer of the same kind as the component "b" is more preferred.

To prepare the agglomerated mixture, an aqueous emulsion of the component "b" having an average particle diameter of 0.01 to 1 $\mu$m, particularly 0.05 to 0.5 $\mu$m is mixed with an aqueous emulsion of polytetrafluoroethylene having an average particle diameter of 0.05 to 10 $\mu$m, particularly 0.05 to 1.0 $\mu$m. The emulsion of polytetrafluoroethylene is obtained by emulsion polymerizing polytetrafluoroethylene using a fluorine-containing surfactant. In the emulsion polymerization, other comonomer such as hexafluoropropylene may be copolymerized in an amount of 10 wt % or less based on the polytetrafluoroethylene.

To obtain the agglomerated mixture, an appropriate polytetrafluoroethylene emulsion preferably has a solid contents of 40 to 70 wt %, particularly preferably 50 to 65 wt % and a styrene-based resin emulsion as the component "b" preferably has a solid contents of 25 to 60 wt %, particularly preferably 30 to 45 wt %. Further, the amount of the polytetrafluoroethylene in the agglomerated mixture is preferably 5 to 40 wt %, particularly preferably 10 to 30 wt % based on 100 wt % of the total of it and the vinyl-based polymer used in the agglomerated mixture. A preferred production method is to mix and stir the above emulsion and charge it into hot water containing a metal salt such as calcium chloride or magnesium sulfate to salt out and solidify the emulsion for separation and recovery. An alternative method is to recover a stirred mixed emulsion by spray drying or freeze drying.

An agglomerated mixture of an emulsion of polytetrafluoroethylene having fibril formability and an emulsion of a vinyl-based polymer in various forms can be used. For example, the agglomerated mixture may be in such a form that each polytetrafluoroethylene particle is covered with the vinyl-based polymer, such a form that the vinyl-based polymer is covered with polytetrafluoroethylene, or such a form that several particles cohere to one particle.

Further, a mixture obtained by graft polymerizing the same or different vinyl-based monomer to the outer layer of an agglomerated mixture may also be used. Preferred examples of the vinyl-based monomer include styrene, α-methylstyrene, methyl methacrylate, cyclohexyl acrylate, dodecyl methacrylate, dodecyl acrylate, acrylonitrile and 2-ethylhexyl acrylate. They may be polymerized alone or copolymerized.

The Metabrene A3000 of Mitsubishi Rayon Co., Ltd. is a typical example of commercially available product of the agglomerated mixture of an emulsion of polytetrafluoroethylene having fibril formability and an emulsion of a vinyl-based polymer and the preferred component "e" of the present invention.

The resin composition-I of the present invention may contain a rubber-like polymer (component "f") to improve its low-temperature impact resistance. The rubber-like polymer is a (meth)acrylate-based core-shell graft copolymer, polyurethane-based elastomer or polyester-based elastomer.

When the rubber-like polymer (component "f") is to be further blended into the resin composition-I, it is preferably blended in an amount of 1 to 10 parts by weight, particularly preferably 2 to 8 parts by weight based on 100 parts by weight of the total of the components "a", "b" and "c".

As described above, typical examples of the rubber-like polymer as the component "f" are a (meth)acrylate-based core-shell graft copolymer (component "f-1"), polyurethane-based elastomer (component "f-2") and polyester-based elastomer (component "f-3").

The (meth)acrylate-based core-shell graft copolymer (component "f-1") is a core-shell polymer consisting of a core which is of a rubber-like alkyl (meth)acrylate polymer having an alkyl group with 2 to 8 carbon atoms, of a copolymer with a diene-besed rubber like polymer and of a mixture of the above two polymers, and a shell formed by polymerizing an alkyl (meth)acrylate and optionally a copolymerizable vinyl monomer, or a multi-layer core-shell polymer formed likewise. A core-shell polymer comprising a core of a diene-based rubber-like polymer alone may also be used. Commercial products of the (meth)acrylate core-shell graft polymer include the HIA-15 and HIA-28 of Kureha Chemical Industry Co., Ltd. Commercial products of the core-shell polymer comprising a core of a diene-based rubber-like polymer alone include the Paraloid EXL-2602 of Kureha Chemical Industry Co., Ltd.

Further, a polymer (to be referred to as "IPN type polymer" hereinafter) obtained by graft polymerizing a composite rubber having such a structure that a polyorganosiloxane component and a poly(meth)alkyl acrylate component are entangled with each other so that they cannot be separated from each other with an alkyl (meth)acrylate and optionally a copolymerizable vinyl monomer may also be used as the component "f-1". Commercial products of the IPN type polymer include the Metablen S-2001 of Mitsubishi Rayon Co., Ltd. The component "f-1" will be described in detail hereinafter.

The polyurethane-based elastomer (component "f-2") as another example of the rubber-like polymer (component "f") is obtained from a reaction among an organic polyisocyanate, polyol and chain extending agent having two or three functional groups and a molecular weight of 50 to 400, and known thermoplastic polyurethane elastomers may be used. The Kuramiron U of Kuraray Co., Ltd. is easily acquired as the thermoplastic polyurethane elastomer.

The polyester-based elastomer (component "f-3") as still another example of the rubber-like polymer (component "f") is obtained by polycondensing a dicarboxylic acid component, alkylene glycol component and polyalkylene glycol component, and known thermoplastic polyester elastomers may be used. The Pelprene of Toyobo Co., Ltd., the Nouvelan of Teijin Limited and the like are easily acquired as the thermoplastic polyester elastomer.

When the present inventors have conducted studies on the improvement of the physical properties of the above resin composition-I, it has been found that a composition obtained by further blending polytetrafluoroethylene having fibril formability (component "e") and a (meth)acrylate-based core-shell graft copolymer (component "f-1") in specific amounts with the resin composition-I which comprises the components "a", "b", "c" and "d" as essential ingredients has more excellent characteristic properties.

According to the present invention, there is provided the following resin composition-II which comprises:

(A) 40 to 92 wt % of an aromatic polycarbonate resin (component "a"), (B) 5 to 40 wt % of a styrene-based resin (component "b"), (C) 3 to 20 wt % of a phosphate-based flame retardant (component "c"), (D) 0.1 to 30 parts by weight of a silicate filler (component "d") based on 100 parts by weight of the total of the components "a", "b" and "c", (E) 0.1 to 2 parts by weight of polytetrafluoroethylene having fibril formability (component "e") based on 100 parts by weight of the total of the components "a", "b" and "c", and (F) 1 to 10 parts by weight of a (meth)acrylate-based core-shell graft copolymer (component "f-1") based on 100 parts by weight of the total of the components "a", "b" and "c", and which has a chlorine compound in terms of chlorine atoms of 100 ppm or less.

The resin composition-II of the present invention is characterized in that it further comprises the components "e" and "f" as essential ingredients unlike the above resin composition-I. In the resin composition-II, the components "a", "b", "c" and "d" are substantially identical to those of the resin composition-I and used in the same amounts as in the resin composition-I. The same compound as that described as an optional component of the resin composition-I is used in the same amount as the component "e".

In the resin composition-II, the (meth)acrylate-based core-shell graft copolymer (component "f-1") which is one kind of rubber-like polymer (component "f") is used as an essential ingredient. This component "f-1" is used in an amount of 0.1 to 10 parts by weight, preferably 2 to 8 parts by weight based on 100 parts by weight of the total of the components "a", "b" and "c".

A detailed description is given of the component "f-1".

The (meth)acrylate-based core-shell graft copolymer (component "f-1") is a copolymer containing an acrylate or methacrylate as the essential ingredient of a core or shell.

The core of the (meth)acrylate-based core-shell graft copolymer is made from a homopolymer of one monomer, a copolymer of two or more monomers, or a copolymer having a so-called IPN (Inter-Penetrating-Network) structure that two or more homopolymers and copolymers are entangled with each other. The (meth)acrylate-based core-shell graft copolymer comprising any one of the cores may be used.

The proportion of the core to,the (meth)acrylate-based core-shell graft copolymer, that is, the proportion of the rubber component must be 30 wt % or more. It is preferably 40 wt % or more, particularly preferably 50 wt % or more. The upper limit is 95 wt %, preferably 90 wt %, particularly preferably 85 wt %. A portion other than the core forms a shell.

The average particle diameter of the core is preferably in the range of 0.08 to 0.6 $\mu$m. When the average particle diameter is smaller than 0.08 $\mu$m, the improvement of impact resistance becomes unsatisfactory and when the average particle diameter is larger than 0.6 $\mu$m, the appearance of a molded product is worsened.

The shell of the (meth)acrylate-based core-shell graft copolymer may be formed by graft polymerizing a homopolymer of one monomer, graft copolymerizing two or more monomers at the same time, or graft polymerizing one or more monomers in multiple stages. The (meth)acrylate-based core-shell graft copolymer comprising any one of the shells may be used.

The above cores and shells may be combined in the (meth)acrylate-based core-shell graft copolymer as the component "f-1".

The core may be made from acrylic rubber, butadiene rubber, isoprene rubber, styrene-butadiene rubber, butyl rubber, ethylene-propylene-diene rubber, chloroprene rubber, nitrile rubber, silicon rubber or epichlorohydrin rubber. Out of these rubber components, butadiene rubber, isoprene rubber, styrene-butadiene rubber and acrylic rubber are preferred from the viewpoint of impact resistance and butadiene rubber is particularly preferred.

And also a copolymer rubber with at least one monomer selected from an acrylic ester, methacrylic ester, butadiene, isoprene, isobutylene, ethylene, propylene, $\alpha$-olefin, ethylidene norbornene, dicyclopentadiene and styrene may be used as the core. This copolymer rubber is preferably used because it can well balance impact resistance, flame retardancy, resistance to wet heat and the like. Out of the above copolymer rubber components, copolymer rubbers of an acrylic ester and/or methacrylic ester and at least one monomer selected from butadiene, isoprene, isobutylene, ethylene, propylene, $\alpha$-olefin, ethylidene norbornene, dicyclopentadiene and styrene are preferred. Copolymers of an acrylic ester and/or methacrylic ester and butadiene and/or isoprene are more preferred and copolymers of an acrylic ester and/or methacrylic ester and butadiene are particularly preferred.

IPN rubbers having such a structure that a silicon rubber component and a rubber component selected from an acrylic rubber component, butadiene rubber component, isoprene rubber component, isobutylene rubber component, ethylene-propylene-diene rubber component and copolymerizing component thereof are entangled with each other so that they cannot be separated from each other may be used. The IPN rubbers have excellent flame retardancy because they contain a silicon rubber component and excellent impact resistance due to their entangled structure between the silicon rubber component and other rubber component. Out of these IPN rubbers, IPN rubbers comprising a silicon rubber component and acrylic rubber component and/or isobutylene rubber component are preferred and IPN rubbers having such a structure that a silicon rubber component and an acrylic rubber component are entangled with each other so that they cannot be separated from each other are more preferred.

As the monomer component forming the shell may be used at least one member selected from acrylic esters, methacrylic esters, aromatic vinyl compounds and vinyl cyanide compounds and other monomer copolymerizable with these. Examples of the copolymerizable other monomer include maleic anhydride, maleimide, N-methylmaleimide, N-phenylmaleimide, N-cyclohexylmaleimide and the like.

Preferably, the acrylic ester or methacrylic ester used in the acrylic rubber, copolymer rubber or IPN rubber of the core of the (meth)acrylate-based core-shell graft copolymer as the component "f-1" has an alkyl group having 2 to 12 carbon atoms. Examples of the acrylic ester include methyl acrylate, ethyl acrylate, n-propyl acrylate, n-butyl acrylate, 2-ethylhexyl acrylate, cyclohexyl acrylate and the like. Out of these, n-butyl acrylate and 2-ethylhexyl acrylate are preferred. Examples of the methacrylic ester include hexyl methacrylate, 2-ethylhexyl methacrylate, n-lauryl methacrylate and the like.

An organosiloxane used in the silicon rubber or IPN rubber of the core of the (meth)acrylate-based core-shell graft copolymer as the component "f-1" has a 3 or more-membered ring, preferably 3- to 6-membered ring. Examples of the organosiloxane include hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane and the like. They may be used alone or in admixture of two or more.

Preferably, the acrylic ester:or methacrylic ester used in the shell of the (meth)acrylate-based core-shell graft copolymer as the component "f-1" has an alkyl group having 1 to 8 carbon atoms. Examples of the acrylic ester include methyl acrylate, ethyl acrylate, n-butyl acrylate, hydroxyethyl acrylate, cyclohexyl acrylate, phenyl acrylate, benzyl acrylate and the like. Examples of the methacrylic ester include methyl methacrylate, ethyl methacrylate, propyl methacrylate, 2-ethylhexyl methacrylate, butyl methacrylate, hydroxyethyl methacrylate, glycidyl methacrylate, cyclohexyl methacrylate, phenyl methacrylate, benzyl methacrylate and the like. Out of these, methyl methacrylate is preferred.

Examples of the aromatic vinyl compound used in the shell of the (meth)acrylate-based core-shell graft copolymer as the component "f-1" include styrene, α-methylstyrene, o-methylstyrene, p-methylstyrene and the like. Out of these, styrene is preferred. Examples of the vinyl cyanide compound include acrylonitrile and methacrylonitrile. Out of these, acrylonitrile is preferred.

A crosslinkable monomer or graft crossing agent may be contained in the core or shell of the (meth)acrylate-based core-shell graft copolymer as the component "f-1". Particularly when a conjugated diene-based component is not contained, they are preferably used.

Examples of the monomer crosslinkable with acrylic esters and methacrylic esters include aromatic divinyl compounds such as divinylbenzene, ethylene glycol dimethacrylate, propylene glycol dimethacrylate, 1,3-butylene glycol dimethacrylate, 1,4-butylene glycol dimethacrylate, allyl methacrylate and the like. Out of these, allyl methacrylate and ethylene glycol dimethacrylate are preferred.

Examples of the graft crossing agent for acrylic esters and methacrylic esters include allyl methacrylate, triallyl cyanurate, triallyl isocyanurate and the like.

Examples of the monomer crosslinkable with organosiloxanes include silane-based compounds having a functionality of 3 or 4 such as trimethoxymethylsilane, triethoxyphenylsilane, tetramethoxysilane, tetraethoxysilane, tetra-n-propoxysilane, tetrabutoxysilane and the like. Out of these, crosslinkable monomers having a functionality of 4 are preferred and tetraethoxysilane is particularly preferred.

Examples of the graft crossing agent for organosiloxanes include compounds which can form units represented by the following formulas (2), (3) and (4).

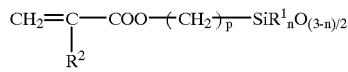　　　(2)

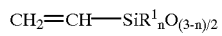　　　(3)

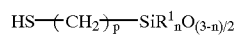　　　(4)

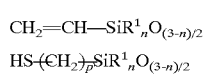

wherein $R^1$ is a methyl group, ethyl group, propyl group or phenyl group, $R^2$ is a hydrogen atom or methyl group, n is 0, 1 or 2, and p is an integer of 1 to 6.

Since an acryloyloxysiloxane or methacryloyloxysiloxane capable of forming the unit of the formula (2) has high graft efficiency, it can form an effective graft chain, which is advantageous in developing impact resistance. A methacryloyloxysiloxane capable of forming the unit of the formula (2) is particularly preferred. Examples of the methacryloyloxysiloxane include β-methacryloyloxyethyl dimethoxymethylsilane, γ-methacryloyloxypropyl methoxydimethylsilane, γ-methacryloyloxypropyl dimethoxymethylsilane, γ-methacryloyloxypropyl trimethoxysilane, γ-methacryloyloxypropyl ethoxydiethylsilane, γ-methacryloyloxypropyl diethoxymethylsilane and δ-methacryloyloxybutyl diethoxymethylsilane.

Out of the above (meth)acrylate-based core-shell graft copolymers as the component "f-1", the following graft copolymers are more preferred.

Preferred Graft Copolymers (Meth)acrylate-based core-shell graft copolymers, each consisting of 40 to 90 wt % of a core made from a rubber selected from (i) a rubber consisting of 60 to 100 wt % of butadiene and 0 to 40 wt % of styrene, (ii) a copolymer rubber consisting of 60 to 90 wt % of an acrylic ester and 10 to 40 wt % of butadiene and (iii) a composite rubber consisting of 5 to 95 wt % of an organosiloxane polymer component and 5 to 95 wt % of a polymer component consisting of an acrylic ester and/or methacrylic ester and having such a structure that the organosilane polymer component and the polymer component are entangled with each other so that they cannot be separated from each other and 10 to 60 wt % of a shell made from a polymer or copolymer comprising one or more monomers selected from an acrylic ester, methacrylic ester, aromatic vinyl compound and vinyl cyanide compound.

Out of the above "preferred graft copolymers", the following graft copolymers (1) to (3) are particularly preferred.

Graft Copolymer (1)

A graft copolymer (may be referred to as "graft copolymer (1)" hereinafter) consisting of 40 to 90 wt % of a core made from a rubber consisting of 60 to 100 wt % of butadiene and 0 to 40 wt % of styrene as a core and 10 to 60 wt % of a shell formed by graft polymerizing a methacrylic ester as an essential ingredient and one or more monomers selected from an aromatic vinyl compound, acrylic ester and vinyl cyanide compound as required by bulk polymerization, suspension polymerization, bulk-suspension polymerization, solution polymerization or emulsion polymerization, particularly emulsion polymerization.

The proportion of the core to the graft copolymer (1) is preferably 60 to 85 wt %, more preferably 65 to 80 wt %. When the proportion of the core is 60 to 85 wt %, it is possible to improve impact resistance and achieve excellent flame retardancy at the same time. A butadiene rubber is more preferred as the core.

A polymer or copolymer consisting of 30 to 100 wt % of a methacrylic ester and 0 to 70 wt % of an aromatic vinyl compound and/or an acrylic ester based on 100 wt % of the total is preferred as the shell. Methyl methacrylate is preferred as the methacrylic ester. A polymer or copolymer consisting of 60 to 100 wt % of methyl methacrylate and 10 to 40 wt % of an acrylic ester such as ethyl acrylate is particularly preferred.

Therefore, the graft copolymer (1) is particularly preferably a graft copolymer consisting of 65 to 80 wt % of a butadiene rubber as the core based on 100 wt % of the total weight of the copolymer and 20 to 35 wt % of a polymer or copolymer consisting of 60 to 100 wt % of methyl methacrylate and 0 to 40 wt % of an acrylic ester such as ethyl acrylate based on 100 wt % of the total weight of the shell.

The graft copolymer (1) is advantageous in improving impact resistance because its core is mainly made from a butadiene rubber component which is very effective in improving impact resistance. Therefore, it is preferably used when a condensed phosphoric ester whose impact resistance readily lowers slightly is used, that is, n is not "0" as the average value in the above formula (1), preferably 0.5 to 3.

Graft Copolymer (2)

A copolymer (may be referred to as "graft copolymer (2)" hereinafter) consisting of 40 to 90 wt % of a core made from a copolymer rubber consisting of 60 to 90 wt % of an acrylic ester and 10 to 40 wt % of butadiene and 10 to 60 wt % of a shell formed by graft polymerizing at least one selected from an acrylic ester, methacrylic ester, aromatic vinyl compound and vinyl cyanide compound in one stage or multiple stages based on 100 wt % of the total of the core and the shell.

The copolymer preferably consists of 50 to 75 wt % of the core and 25 to 50 wt % of the shell, more preferably 50 to 70 wt % of the core and 30 to 50 wt % of the shell.

As for the ratio of the acrylic ester to butadiene in the core, it is more preferred that the amount of the acrylic ester should be 60 to 80 wt % and the amount of butadiene should be 20 to 40 wt % based on 100 wt % of the total weight of the core. The core may contain other copolymerizable monomer, preferably a methacrylic ester or aromatic vinyl in an amount of 20 wt % or less based on 100 wt % of the total weight of the core.

Since the graft copolymer (2) contains an acrylic ester component having excellent weatherability and flame retardancy and a butadiene component having excellent impact resistance in the core in a well balanced manner, it is possible to obtain a resin composition which is well balanced among characteristic properties such as flame retardancy, impact resistance, weatherability and coloring.

The acrylic ester used in the core of the graft copolymer (2) is preferably n-butyl acrylate or 2-ethylhexyl acrylate, particularly preferably 2-ethylhexyl acrylate. The methacrylic ester used in the shell is particularly preferably methyl methacrylate.

The average particle diameter of the core of the graft copolymer (2) is preferably 0.08 to 0.25 µm, particularly preferably 0.13 to 0.20 µm.

The shell of the graft copolymer (2) is made from a polymer or copolymer comprising at least one selected from an aromatic vinyl compound, vinyl cyanide compound, methacrylic ester and acrylic ester. The polymer or copolymer preferably contains an aromatic vinyl compound and a methacrylic ester, particularly preferably a methacrylic ester, so as to make use of the excellent characteristic properties of the core.

As for the ratio of the monomers of the shell of the graft copolymer (2), the amount of the methacrylic ester is preferably 45 to 80 wt %, more preferably 55 to 70 wt % based on 100 wt % of the total weight of the shell. Therefore, the total amount of the aromatic vinyl compound and other component is preferably 20 to 55 wt %, more preferably 30 to 45 wt %. When the shell further contains a vinyl cyanide compound and an acrylic ester, the total amount of these is preferably 20 to 35 wt %, more preferably 22 to 30 wt % based on 100 wt % of the total including the aromatic vinyl compound. The other component is preferably a vinyl cyanide compound.

The shell of the graft copolymer (2) of the present invention is preferably formed by two-stage graft polymerization, the graft component of the first stage is a mixture of an aromatic vinyl compound and a methacrylic ester or a mixture of an aromatic vinyl compound, vinyl cyanide compound and a methacrylic ester, the graft component of the second stage is a methacrylic ester, and the shell consists of the first-stage graft component in an amount of 40 to 75 wt % and the second-stage graft component in an amount of 25 to 60 wt %, more preferably the first-stage graft component in an amount of 42 to 70 wt % and the second-stage graft component in an amount of 30 to 58 wt %.

Further, the graft copolymer (2) of the present invention may contain a crosslinkable monomer and a graft crossing agent as required when the core of the copolymer and the shell of each stage are polymerized. The total amount of these components is 0.01 to 3 wt % based on 100 wt % of the total weight of the monomers used for the polymerization of the core or 0.01 to 2 wt % based on 100 wt % of the total weight of the monomers of each stage for the polymerization of the shell of each stage.

The graft copolymer (2) may be subjected to an antiblocking improving treatment to eliminate a dispersion failure at the time of the production of the resin composition of the present invention. Known methods for improving antiblocking properties may be employed.

The methods include one in which a latex of the graft copolymer is sprayed and dried to obtain spherical powders, one in which conditions for salting out a latex of the copolymer are adjusted, and one in which an additive such as a lubricant is added. There is also available one in which 0.1 to 25 parts by weight of a graft copolymer which has improved characteristic properties of powder and is obtained by graft polymerizing 5 to 49 wt % of an elastic trunk polymer with 51 to 95 wt % of a monomer forming a hard polymer is blended into 100 parts by weight of the graft copolymer (2) in the form of a slurry. The expression "elastic trunk polymer" as used herein denotes a polymer or copolymer of monomers used in the core of the graft copolymer (2) and the expression "monomer forming a hard polymer" denotes a monomer used in the shell of the graft copolymer (2).

Alternatively, one in which an emulsion of a hard non-elastic polymer is added to a slurry of the solidified graft copolymer (2) may be used. The hard non-elastic polymer is a polymer of at least one monomer selected from an aromatic vinyl compound, vinyl cyanide compound and methacrylic ester. It preferably contains methyl methacrylate in an amount of 80 wt % or more.

Out of the above methods for the improvement of antiblocking properties, one in which a graft copolymer having improved characteristic properties of powder or hard non-elastic polymer is blended into the graft copolymer (2) in the form of a slurry is preferred because anti-blocking properties can be achieved simply and effectively. The method for improving anti-blocking properties by adding the graft copolymer having improved characteristic properties of powder or hard non-elastic polymer is carried out with the above range of each component of the graft copolymer (2) of the present invention.

The particularly preferred graft copolymer (2) consists of 50 to 70 wt % of a core made from a rubber latex which consists of 60 to 80 wt % of an acrylic ester and 20 to 40 wt % of butadiene and 30 to 50 wt % of a shell obtained by graft polymerizing a mixture of an aromatic vinyl compound and a methacrylic ester and a vinyl cyanide compound as required in two stages based on 100 wt % of the total of the core and the shell. The methacrylic ester is contained in the shell in an amount of 55 to 70 wt % based on 100 wt % of the shell. When the vinyl cyanide compound is contained, it is used in an amount of 22 to 30 wt % based on 100 wt % of the total of the vinyl cyanide compound and the aromatic vinyl compound. The first graft component is a mixture of an aromatic vinyl compound and a methacrylic ester or a mixture of an aromatic vinyl compound, vinyl cyanide compound and methacrylic ester, the second graft component is a methacrylic ester, the first graft component is used in an amount of 42 to 70 wt %, and the second graft component is used in an amount of 30 to 58 wt % based on 100 wt % of the total of the shell components. Illustrative examples of the graft copolymer (2) include the HIA-15, HIA-28 and HIA-28S of Kureha Chemical Industry, Co., Ltd.

Graft Copolymer (3)

A graft copolymer (may be referred to as "graft copolymer (3)" hereinafter) consisting of 40 to 90 wt % of a core made from a composite rubber which consists of 5 to 95 wt % of an organosiloxane polymer component and 5 to 95 wt % of a polymer component consisting of an acrylic ester and/or methacrylic ester and having such a structure that these components are entangled with each other so that they cannot be separated from each other and 10 to 60 wt % of a shell made from a polymer or copolymer of one or more monomers selected from an acrylic ester, methacrylic ester, aromatic vinyl compound and vinyl cyanide compound.

As for the ratio of the organosiloxane polymer component to the polymer component consisting of an acrylic ester and/or methacrylic ester in the core, the amount of the organosiloxane polymer component is preferably 5 to 70 wt %, more preferably 6 to 60 wt %, the most preferably 7 to 50 wt %, and the amount of the acrylic ester and/or methacrylic ester is preferably 30 to 95 wt %, more preferably 40 to 94 wt %, the most preferably 50 to 93. wt % based on 100 wt % of the total weight of these components.

The amount of the composite rubber as the core in the graft copolymer (3) is preferably 60 to 90 wt %, more preferably 60 to 85 wt % based on 100 wt % of the total weight of the copolymer. When the amount is 60 to 90 wt %, it is possible to improve impact resistance and achieve excellent flame retardancy at the same time.

The average particle diameter of the composite rubber is preferably 0.08 to 0.6 µm, more preferably 0.1 to 0.4 µm.

To produce the composite rubber of the graft copolymer (3), emulsion polymerization is the most appropriate. It is preferred that an organosiloxane polymer latex should be first prepared and an acrylic ester monomer and/or methacrylic ester monomer should be impregnated into the rubber particles of the organosiloxane polymer latex and then polymerized.

The organosiloxane polymer component forming the composite rubber can be prepared by emulsion polymerizing an organosiloxane shown below in the presence of the above monomer crosslinkable with organosiloxane, and the above graft crossing agent for organosiloxane may be used in the emulsion polymerization.

The organosiloxane has a 3 or more-membered ring, preferably 3- to 6-membered ring, as exemplified by hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane and the like. They may be used alone or in admixture of two or more. The amount of the organosiloxane is 50 wt % or more, preferably 70 wt % of more based on the polyorganosiloxane rubber component.

The crosslinkable monomer is preferably tetrafunctional, particularly preferably tetraethoxysilane. The amount of the crosslinkable monomer in the organosiloxane polymer component in the composite rubber of the graft copolymer (3) is 0.1 to 30 wt %, preferably 0.5 to 10 wt % based on 100 wt % of the organosiloxane polymer component. What have been enumerated above may be used as the graft crossing agent and its amount is 0 to 10 wt % based on the organosiloxane polymer component.

The organosiloxane polymer latex can be produced by methods disclosed by U.S. Pat. No. 2891920 and U.S. Pat. No. 3294725, for example. For instance, the latex is preferably produced by a method which comprises mixing a mixed solution of an organosiloxane and a crosslinkable monomer and optionally a graft crossing agent with water by shearing using a homogenizer in the presence of an sulfonic acid-based emulsifier such as an alkylbenzenesulfonic acid or alkylsulfonic acid. The alkylbenzenesulfonic acid is preferred because it serves as an emulsifier for the organosiloxane and also a polymerization initiator. When an alkylbenzenesulfonic acid metal salt or alkylsulfonic acid metal salt is used at this point, it is effective in maintaining the polymer stably during graft polymerization.

The polymer consisting of an acrylic ester and/or methacrylic ester and forming the composite rubber is produced by adding the above acrylic ester and/or methacrylic ester, crosslinkable monomer and graft crossing agent to the organosiloxane polymer latex which has been neutralized by adding an aqueous solution of alkali such as sodium hydroxide, potassium hydroxide or sodium carbonate to impregnate them into the organosiloxane polymer rubber particles and causing an ordinary radical polymerization initiator to function. The total amount of the crosslinkable monomer and graft crossing agent for the acrylic ester and so on is 0.1 to 20 wt %, preferably 0.5 to 10 wt % based on 100 wt % of the polymer consisting of an acrylic ester and/or methacrylic ester.

Along with the proceeding of polymerization, the crosslinking network of the polymer consisting of an acrylic ester and/or methacrylic ester which is entangled with the crosslinking network of the organosiloxane polymer rubber is formed and a latex of the composite rubber consisting of the organosiloxane polymer and the polymer consisting of an acrylic ester and/or methacrylic ester which cannot be substantially separated from each other is thereby obtained.

The composite rubber preferably has such a structure that the main skeleton of the organosiloxane polymer has a dimethysiloxane recurring unit and the main skeleton of the polymer consisting of an acrylic ester and/or methacrylic ester has an n-butyl acrylate recurring unit.

The composite rubber prepared by emulsion polymerization can be graft copolymerized with a vinyl-based monomer and the organosiloxane polymer component and the polymer component consisting of an acrylic ester and/or methacrylic ester are firmly entangled with each other so that they cannot be extracted and separated from each other with an ordinary organic solvent such as acetone or toluene. The gel content of this composite rubber measured by extracting with toluene at 90° C. for 12 hours is 80 wt % or more.

Examples of the vinyl-based monomer to be graft polymerized with the composite rubber include the above aromatic vinyl compound, methacrylic ester, acrylic ester, vinyl cyanide compound and the like. They may be used alone or in combination of two or more.

The graft copolymer (3) can be separated and recovered by charging a latex obtained by adding the above vinyl-based monomer to a composite rubber latex and polymerizing them in a single stage or multiple stages by a radical polymerization technique into hot water containing a metal such as calcium chloride or magnesium sulfate, salting-out and solidification.

The preferred graft copolymer (3) consists of 60 to 85 wt % of a core made from a composite rubber having such a structure that 7 to 50 wt % of an organosiloxane polymer component and 50 to 93 wt % of an acrylic ester and/or methacrylic ester are entangled with each other so that they cannot be separated from each other and 15 to 40 wt % of a shell made from a polymer or copolymer of one or more monomers selected from an acrylic ester, methacrylic ester, aromatic vinyl compound and vinyl cyanide compound based on 100 wt % of the total of the core and the shell.

The (meth)acrylic core-shell graft copolymer as the component "f-1" of the present invention may be a mixture of the above graft polymer and a polymer or copolymer obtained by polymerizing 70 to 100 wt % of one or more monomers selected from a methacrylic ester, acrylic ester, aromatic vinyl compound and vinyl cyanide compound with 0 to 30 wt % of other monomer copolymerizable with the above monomer as forming shell component. The polymer and copolymer components may be mixed separately in addition to a free polymer and/or copolymer formed in the course of graft polymerization.

Out of the above preferred graft copolymers (1) to (3), the graft copolymer (2) is superior to the other graft copolymers in both the flame retarding effect and coloring. The flame retarding effect and coloring of the graft copolymer (2) are marked when the proportion of the phosphate-based flame retardant as the component "c" is relatively small.

The resin composition can be produced by mixing the above components with a mixer such as a tumbler, V-type blender, Nauta mixer, Banbury mixer, kneading roll or extruder. Further, other thermoplastic resin such as a polyester, polyamide or polyphenylene ether may be mixed in limits not prejudicial to the object of the present invention and a polyorganosiloxane-based flame retardant can be blended.

Additives which are generally blended in trace amounts, such as a heat stabilizer (such as a phosphoric ester or phosphorous ester), antioxidant (such as a hindered phenol-based compound), a light stabilizer (such as a benzotriazole-based compound, hindered amine-based compound or benzophenone-based compound), colorant, foaming agent and antistatic agent, can be blended. They may be blended alone or in the form of a master pellet of these resins.

The heat stabilizer is a known phosphorous acid, phosphoric acid, phosphonous acid, phosphonic acid or ester thereof. Illustrative examples of the heat stabilizer include phosphite compounds such as triphenyl phosphite, trisnonylphenyl phosphite, tris(2,4-di-tert-butylphenyl) phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl) pentaerythritol diphosphite, 2,2'-methylenebis(4,6-di-tert-butylphenyl)octyl phosphite, bis(nonylphenyl)pentaerythritol diphosphite and bis(2,4-di-tert-butylphenyl)pentaerythritol diphosphite; phosphate compounds such as tributyl phosphate, trimethyl phosphate, tricresyl phosphate, triphenyl phosphate, trichlorophenyl phosphate, triethyl phosphate, diphenylcresyl phosphate, diphenylmonoorthoxenyl phosphate, tributoxyethyl phosphate, dibutyl phosphate, dioctyl phosphate and diisopropyl phosphate; and phosphonite compounds such as tetrakis(2,4-di-tert-butylphenyl)-4,4'-biphenylene diphosphonite, tetrakis(2,4-di-tert-butylphenyl)-4,3'-biphenylene diphosphonite, tetrakis (2,4-di-tert-butylphenyl)-3,3'-biphenylene diphosphonite and bis(2,4-di-tert-butylphenyl)-4-biphenylene diphosphonite as other phosphorus-based heat stabilizers. Out of these, preferred are trisnonylphenyl phosphite, distearylpentaerythritol diphosphite, bis(2,4-di-tert-butylphenyl)pentaerythritol diphosphite, tris(2,4-di-tert-butylphenyl)phosphite, triphenyl phosphate, trimethyl phosphate and tetrakis(2,4-di-tert-butylphenyl)-4,4'-biphenylene diphosphonite. These heat stabilizers may be used alone or in admixture of two or more.

Besides the above heat stabilizers, a hindered phenol-based compound or sulfur-based compound which is generally known as an antioxidant is preferably blended as the heat stabilizer of the present invention. The compound is preferred because it retains the heat stability of a styrene-based resin and suppresses the heat decomposition of the resin. Illustrative examples of the compound include n-octadecyl-3-(3,5-di-tert-butyl-4-hydroxyphenyl) propionate, 4,4'-butylidenebis(3-methyl-6-tert-butylphenol), 4,4'-thiobis(3-methyl-6-tert-butylphenol), 2,2'-methylenebis(4-methyl-6-tert-butylphenol), tris(3,5-di-tert-butyl-4-hydroxybenzyl)isocyanurate, 2,6-di-tert-butyl-4-methylphenol, 2,4-di-tert-amyl-6-[1-(3,5-di-tert-amyl-2-hydroxyphenyl)ethyl]phenyl acrylate, pentaerythrityl tetrakis(3-laurylthiopropionate), dilauryl-3,3'-thiodipropionate, dimyristyl-3,3'-thiodipropionate, distearyl-3,3'-thiodipropionate and the like.

The thus obtained resin composition can be easily formed by extrusion molding, injection molding or compression molding, particularly preferably injection molding. Blow molding or vacuum molding may also be employed. The resin composition is the best suited as a material for electric and electronic parts and OA exterior applications which must attain UL94V-0 rating.

A molded product of the polycarbonate resin composition of the present invention attains V-0 rating in a UL standard 94V flammability test while it comprises a phosphate-based flame retardant. In addition, it has excellent resistance to wet heat and rarely experiences a reduction in impact resistance during its long-term use. Stated more specifically, there can be obtained a molded product which attains V-0 rating as it comprises a phosphate-based flame retardant and has an impact resistance retainability of 50% or more when it is stored at a temperature of 65° C. and a relative humidity of 85% for 500 hours and an apparent molecular weight retainability of 80% or more. It is also possible to obtain a molded product having an impact resistance retainability of 50% or more when it is stored at a temperature of 65° C. and a relative humidity of 85% for 1,000 hours and an apparent molecular weight retainability of 80% or more. It is the best suited as a material for electric and electronic parts and OA exterior applications which must have long service life and resistance to wet heat.

EXAMPLES

The following examples are given to further illustrate the present invention. "Parts" in the examples means "parts by weight" and evaluations were made in accordance with the following methods.

(1) resistance to wet heat-1: A ⅛" Izod impact test piece was notched and subjected to a wet heat treatment with a environmental tester (Platinas Sub-zero Lucifer of Tabai Espec Corp.) at 65° C. and 85% RH for 500 hours to measure its Izod notched impact resistance value in accordance with ASTM D256 to be compared with the Izod notched impact resistance value before the wet heat treatment. The retainability is expressed as the percentage of the value after the wet heat treatment to the value before the wet heat treatment.

(2) resistance to wet heat-2: The apparent viscosity average molecular weight of a test piece after the wet heat treatment (1) was measured by the same technique as that for the measurement of the molecular weight of an aromatic polycarbonate resin. That is, the test piece was dissolved in methylene chloride, an undissolved portion was removed by filtration to obtain a solution, the specific viscosity of the solution was measured in the same manner as the measurement of the viscosity average molecular weight of the polycarbonate resin of this text, and the apparent viscosity average molecular weight was calculated using the same calculation expression. The retainability is expressed as the percentage of the value after the wet heat treatment to the value before the wet heat treatment.

(3) flame retardancy: A flammability test for a thickness of 1.6 mm was carried out in accordance with UL standard 94V.

(4) impact resistance: The value of Izod notched impact resistance was measured in accordance with ASTM D256.

I. Description of each Constituent Component

I-(1) Component "a" (Polycarbonate Resin)

Reference Example 1
(Production of Polycarbonate Resin PC-1)

A stirrer shaped like a ribbon was set as an agitation blade in the vessel of a double-axial type of a horizontal axis rotary mixer having an effective inner volume of 500 liters and equipped with supply port of an organic solvent for a polycarbonate, hot water supply port, steam introduction port, vaporized organic solvent exhaust port and overflow type exhaust port. 50 g of polycarbonate resin granules having an average particle diameter of 7 mm and 250 g of water were charged into the vessel, a methylene chloride solution containing 16 wt % of a polycarbonate resin having an average molecular weight of 22,000 was supplied at a rate of 10 kg/min under agitation at a rate of 80 rpm when the temperature in the vessel reached 77° C., and hot water was also supplied at a rate of 10 kg/min. While these were supplied, the volume rate of the amount of the hot water in the vessel to the amount of the polycarbonate resin granules was maintained at about 5, and the temperature in the vessel was maintained at 77° C. by heating the steam introduction port and a jacket using steam having a pressure of 2.7 kg/cm$^2$. The stirring capacity was 6 kw/hr·m$^3$. After the start of supply, the level of a slurry in the vessel rose, and the formed polycarbonate resin granules and the hot water were exhausted from the exhaust ports equipped in the upper portion of the vessel. At this point, the residence time of the polycarbonate resin granules was 1 hour.

Thereafter, a sample was collected after the granules were exhausted and the properties of the granules became stable. The polycarbonate resin granules and hot water exhausted from the exhaust ports were separated by a vertical centrifugal separator(of Kokusan Enshinki K.K.) at a centrifugal force of 1,500 G and then the polycarbonate resin granules were separated by filtration. The separated polycarbonate resin granules were;ground to an average particle diameter of 2 mm by a grinder and dried with a hot air drier at 14° C. for 4 hours. The obtained polycarbonate resin had a viscosity average molecular weight of 22,000, a bulk density of 0.3 g/cm$^3$ and a chlorine atom content of 5 ppm. The obtained polycarbonate resin is designated PC-1.

Reference Example 2
(Production of Polycarbonate Resin PC-2)

A polycarbonate resin was produced by the production method shown in Reference Example 1 in the same manner as in Reference 1 except that the temperature in the vessel was set to 70° C. The obtained polycarbonate resin had a viscosity average molecular weight of 22,000, a bulk density of 0.4 g/cm$^3$ and a chlorine atom content of 50 ppm. The obtained polycarbonate resin is designated PC-2.

Reference Example 3
(Production of Polycarbonate resin PC -3)

A polycarbonate resin was produced by the production method shown in Reference Example 1 in the same manner as in Reference Example 1 except that the temperature in the vessel was set to 50° C. The thus obtained polycarbonate resin had a viscosity average molecular weight of 22,000, a bulk density of 0.65 g/cm$^3$ and a chlorine atom content of 370 ppm. The obtained polycarbonate resin is designated PC-3.

I-(2) Component "b" (Styrene-based Resin)

Reference Example 4
(Preparation of ABS-1)

After bulk polymerization, a polymer was obtained by a separation collector comprising a shell and tube heat exchanger and a vacuum chamber and then ABS resin was obtained by pelletizing the polymer with a multi-stage vented double-screw extruder. The ABS resin consisted of 15 wt % of acrylonitrile, 20 wt % of butadiene and 65 wt % of styrene. The ABS resin had a weight average molecular weight of a free acrylonitrile-styrene polymer of 90,000 (in terms of standard polystyrene measured by GPC), a graft efficiency of 55%, an average rubber particle diameter obtained by observation through an electron microscope of 0.80 μm and a residual acrylonitrile monomer content of 250 ppm obtained by measuring a chloroform solution of the ABS resin by liquid chromatography. This ABS resin is designated ABS-1.

Reference Example 5
(Preparation of ABS-2)

ABS-1 obtained in the above Reference Example 4 was charged into a stainless steel vessel having an agitating blade, and methanol was added in an amount (weight ratio) 7 times that of ABS-1 and stirred for 1 hour to wash the ABS-1. Thereafter, the ABS-I was vacuum dried at 60° C. for 12 hours. The amount of the residual acrylonitrile monomer in the ABS resin was 80 ppm. This ABS resin is designated ABS-2.

Reference Example 6
(Preparation of ABS-3)

ABS-1 obtained in the above Reference Example 4 was washed with methanol three times in the same manner as in ABS-2 each for 2 hours and then vacuum dried at 60° C. for 12 hours. The amount of the residual acrylonitrile monomer in the ABS resin was 20 ppm. This ABS resin is designated ABS-3.

Reference Example 7
(Preparation of ABS-4)

10 parts by weight of a polybutadiene latex (solid content), 34.8 parts by weight of styrene and 5.2 parts by weight of acrylonitrile were emulsion graft polymerized. The obtained graft copolymer was solidified with diluted sulfuric acid, washed, filtered and vacuum dried at 60° C. for 12 hours. The obtained ABS resin comprised 69.5 wt % of styrene, 20 wt % of butadiene and 10.5 wt % of acrylonitrile and had a weight average molecular weight of a free acrylonitrile-styrene polymer (in terms of standard polystyrene measured by GPC) of 120,000, a graft efficiency of 50%, and an average rubber particle diameter measured by observation through an electron microscope of 0.40 μm and a residual acrylonitrile monomer content measured by liquid chromatography of 50 ppm. This ABS resin is designated ABS-4.

I-(3) component "c" (Phosphate-based Flame Retardant)

FR-1: triphenyl phosphate (TPP of Daihachi Chemical Industry Co., Ltd.)

FR-2: resorcinol bis(dixylenyl phosphate) (Adekastab FP-500 of Asahi Denka Kogyo K.K.)

I-(4) component "d" (Silicate Filler)

talc-1: talc (Talc P-3 of Nippon Talc Co., Ltd. having an average particle diameter of about 3 μm)

talc-2: talc (HSTO0.8 of Hayashi Kasei Co., Ltd. having an average particle diameter of about 5 μm)

WSN-1: wollastonite (WIC10 of KINSEI MATEC Co., Ltd. having an average fiber diameter of 4.5 μm and an aspect ratio L/D of 8)

WSN-2: wollastonite (Sicatec NN-4 of Tomoe Engineering Co., Ltd. having an average fiber diameter of 1.5 μm and an aspect ratio L/D of 20)

mica: mica powder (A-41 of YAMAGUCHI MICA Co., Ltd. having an average particle diameter of about 40 μm) (filler other than component "d")

CF: carbon fiber (Besfight HTA-C6-U of Toho Rayon Co., Ltd. based on PAN, having an urethane sizing and diameter of 7 μm)

I-(5) Component "e" (Polytetrafluoroethylene) PTFE: polytetrafluoroethylene (F-201L of Daikin Industries Co., Ltd.)

I-(6) component "f" (Rubber-like Polymer)

rubber-1: methyl methacrylate.2-ethylhexyl acrylate.butadiene.styrene multi-stage graft copolymer (styrene content of 15 wt %) (HIA-15 of Kureha Chemical Industry Co., Ltd.)

rubber-2: butadiene-based impact modifier (EXL2602 of Kureha Chemical Industry Co., Ltd.)

rubber-3: acryl-silicon-based impact modifier (S-2001 of Mitsubishi Rayon Co., Ltd.)

Examples 1 to 16 and Comparative Examples 1 to 4

Components shown in Table 1 and Table 2 below were mixed together in amounts shown in Table 1 and Table 2 with a V-type blender and the obtained mixtures were pelletized at a cylinder temperature of 240° C. with a vented double-screw extruder having a diameter of 30 mm (TEX30XSST of The Japan Steel Works, Ltd.). The pellets were dried at 100° C. for 5 hours and test pieces were formed from the pellets at a cylinder temperature of 250° C. and a mold temperature of 70° C. with an injection molding machine (T-150D of FANUC Ltd.) and evaluated. The evaluation results are shown in Table 1 and Table 2.

TABLE 1

| | item | | unit | Ex. 1 | Ex. 2 | Ex. 3 | Ex. 4 | Ex. 5 |
|---|---|---|---|---|---|---|---|---|
| composition | component "a" | PC-1 | wt % | 70 | 70 | 70 | | |
| | component "a" | PC-2 | wt % | | | | 70 | 70 |
| | component "a" | PC-3 | wt % | | | | | |
| | component "b" | ABS-1 | wt % | | | | | |
| | component "b" | ABS-2 | wt % | 20 | | | 20 | 20 |
| | component "b" | ABS-3 | wt % | | 20 | | | |
| | component "b" | ABS-4 | wt % | | | 20 | | |
| | component "c" | FR-1 | wt % | 10 | 10 | 10 | 10 | 10 |
| | component "c" | FR-2 | wt % | | | | | |
| | * | total | parts by weight | 100 | 100 | 100 | 100 | 100 |
| | component "d" | Talc-1 | parts by weight | 2 | 2 | 2 | 2 | |
| | component "d" | Talc-2 | parts by weight | | | | | |
| | component "d" | WSN-1 | parts by weight | | | | | 2 |
| | component "d" | WSN-2 | parts by weight | | | | | |
| | component "d" | mica | parts by weight | | | | | |
| | not component "d" | CF | parts by weight | | | | | |
| | component "e" | PTFE | parts by weight | 0.5 | 0.5 | 0.5 | 0.5 | 0.5 |
| | component "f" | rubber-1 | parts by weight | | | | | |
| | component "f" | rubber-2 | parts by weight | | | | | |
| | component "f" | rubber-3 | parts by weight | | | | | |
| | chlorine atom content of molded product | | ppm | 3 | 3 | 3 | 32 | 30 |
| | acrylonitrile monomer content of molded product | | ppm | 22 | 5 | 16 | 20 | 23 |
| characteristic properties | impact resistance value | before wet heat treatment | kgf · cm/cm | 52 | 54 | 55 | 50 | 46 |
| | | after wet heat treatment | | 42 | 45 | 30 | 37 | 34 |
| | | retainability | % | 81 | 83 | 55 | 74 | 74 |
| | apparent molecular weight | before wet heat treatment | — | 20700 | 20800 | 20600 | 20700 | 20700 |
| | | after wet heat treatment | | 20500 | 20600 | 19900 | 20400 | 20400 |
| | | retainability | % | 99 | 99 | 97 | 99 | 99 |
| | flame retardancy | (before wet heat treatment) | 1.6 mm thick | V-0 | V-0 | V-0 | V-0 | V-0 |

| item | | unit | Ex. 6 | Ex. 7 | Ex. 8 | Ex. 9 |
|---|---|---|---|---|---|---|

TABLE 1-continued

| composition | component "a" | PC-1 | wt % | | | | |
|---|---|---|---|---|---|---|---|
| | component "a" | PC-2 | wt % | 70 | 70 | 70 | 70 |
| | component "a" | PC-3 | wt % | | | | |
| | component "b" | ABS-1 | wt % | | | | |
| | component "b" | ABS-2 | wt % | 20 | 20 | 20 | 20 |
| | component "b" | ABS-3 | wt % | | | | |
| | component "b" | ABS-4 | wt % | | | | |
| | component "c" | FR-1 | wt % | 10 | 10 | 10 | 10 |
| | component "c" | FR-2 | wt % | | | | |
| | * | total | parts by weight | 100 | 100 | 100 | 100 |
| | component "d" | Talc-1 | parts by weight | | 10 | 10 | 10 |
| | component "d" | Talc-2 | parts by weight | | | | |
| | component "d" | WSN-1 | parts by weight | | | | |
| | component "d" | WSN-2 | parts by weight | | | | |
| | component "d" | mica | parts by weight | 2 | | | |
| | not component "d" | CF | parts by weight | | | | |
| | component "e" | PTFE | parts by weight | 0.5 | 0.5 | 0.5 | 0.5 |
| | component "f" | rubber-1 | parts by weight | | 4 | | |
| | component "f" | rubber-2 | parts by weight | | | 4 | |
| | component "f" | rubber-3 | parts by weight | | | | 4 |
| | chlorine atom content of molded product | | ppm | 28 | 25 | 23 | 26 |
| | acrylonitrile monomer content of molded product | | ppm | 23 | 22 | 22 | 25 |
| characteristic properties | impact resistance value | before wet heat treatment | kgf·cm/cm | 40 | 34 | 43 | 40 |
| | | after wet heat treatment | | 29 | 24 | 35 | 28 |
| | | retainability | % | 73 | 71 | 81 | 70 |
| | apparent molecular weight | before wet heat treatment | — | 20500 | 20400 | 20400 | 20000 |
| | | after wet heat treatment | | 20200 | 20000 | 20000 | 19500 |
| | | retainability | % | 99 | 98 | 98 | 98 |
| | flame retardancy | (before wet heat treatment) | 1.6 mm thick | V-0 | V-0 | V-0 | V-0 |

Ex.: Example

TABLE 2

| | item | | unit | Ex. 10 | Ex. 11 | Ex. 12 | Ex. 13 | Ex. 14 | Ex. 15 | Ex. 16 |
|---|---|---|---|---|---|---|---|---|---|---|
| composition | component "a" | PC-1 | wt % | | | | | | | |
| | component "a" | PC-2 | wt % | 70 | 70 | 70 | 70 | 70 | 70 | 70 |
| | component "a" | PC-3 | wt % | | | | | | | |
| | component "b" | ABS-1 | wt % | | | | | | | |
| | component "b" | ABS-2 | wt % | 20 | 20 | 20 | 20 | 20 | 20 | 20 |
| | component "b" | ABS-3 | wt % | | | | | | | |
| | component "b" | ABS-4 | wt % | | | | | | | |
| | component "c" | FR-1 | wt % | | | | | | | |
| | component "c" | FR-2 | wt % | 10 | 10 | 10 | 10 | 10 | 10 | 10 |
| | * | total | parts by weight | 100 | 100 | 100 | 100 | 100 | 100 | 100 |
| | component "d" | Talc-1 | parts by weight | 2 | 10 | 10 | 10 | | | |
| | component "d" | Talc-2 | parts by weight | | | | | 10 | | |
| | component "d" | WSN-1 | parts by weight | | | | | | 10 | |
| | component "d" | WSN-2 | parts by weight | | | | | | | 10 |
| | component "d" | mica | parts by weight | | | | | | | |
| | not component "d" | CF | parts by weight | | | | | | | |
| | component "e" | PTFE | parts by weight | 0.5 | 0.5 | 0.5 | 0.5 | 0.5 | 0.5 | 0.5 |
| | component "f" | rubber-1 | parts by weight | | 4 | | | | 4 | 4 |
| | component "f" | rubber-2 | parts by weight | | | 4 | | 4 | | |
| | component "f" | rubber-3 | parts by weight | | | | 4 | | | |
| | chlorine atom content of molded product | | ppm | 30 | 22 | 24 | 24 | 21 | 22 | 20 |
| | acrylonitrile monomer content of molded product | | ppm | 20 | 22 | 23 | 25 | 28 | 23 | 22 |
| characteristic properties | impact resistance value | before wet heat treatment | kgf·cm/cm | 43 | 31 | 41 | 36 | 37 | 14 | 13 |
| | | after wet heat treatment | | 26 | 22 | 34 | 25 | 31 | 12 | 10 |
| | | retainability | % | 60 | 71 | 83 | 69 | 84 | 86 | 78 |
| | apparent molecular weight | before wet heat treatment | — | 20300 | 20300 | 20300 | 19800 | 20300 | 20300 | 20100 |
| | | after wet heat treatment | | 19800 | 19900 | 19900 | 19200 | 19900 | 19900 | 19500 |
| | | retainability | % | 98 | 98 | 98 | 97 | 98 | 98 | 97 |
| | flame retardancy | (before wet heat treatment) | 1.6 mm thick | V-0 | V-0 | V-0 | V-0 | V-0 | V-0 | V-0 |

TABLE 2-continued

| | item | | unit | C. Ex. 1 | C. Ex. 2 | C. Ex. 3 | C. Ex. 4 |
|---|---|---|---|---|---|---|---|
| composition | component "a" | PC-1 | wt % | | | | |
| | component "a" | PC-2 | wt % | | 70 | 77 | 70 |
| | component "a" | PC-3 | wt % | 70 | | | |
| | component "b" | ABS-1 | wt % | 20 | | | |
| | component "b" | ABS-2 | wt % | | 20 | 23 | 20 |
| | component "b" | ABS-3 | wt % | | | | |
| | component "b" | ABS-4 | wt % | | | | |
| | component "c" | FR-1 | wt % | 10 | 10 | | 10 |
| | component "c" | FR-2 | wt % | | | | |
| | * | total | parts by weight | 100 | 100 | 100 | 100 |
| | component "d" | Talc-1 | parts by weight | 2 | | | |
| | component "d" | Talc-2 | parts by weight | | | | |
| | component "d" | WSN-1 | parts by weight | | | | |
| | component "d" | WSN-2 | parts by weight | | | | |
| | component "d" | mica | parts by weight | | | | |
| | not component "d" | CF | parts by weight | | | | 2 |
| | component "e" | PTFE | parts by weight | 0.5 | 0.5 | 0.5 | 0.5 |
| | component "f" | rubber-1 | parts by weight | | | | |
| | component "f" | rubber-2 | parts by weight | | | | |
| | component "f" | rubber-3 | parts by weight | | | | |
| | chlorine atom content of molded product | | ppm | 185 | 36 | 33 | 28 |
| | acrylonitrile monomer content of molded product | | ppm | 61 | 22 | 30 | 23 |
| characteristic properties | impact resistance value | before wet heat treatment | kgf · cm/cm | 38 | 56 | 63 | 24 |
| | | after wet heat treatment | | 8 | 5 | 55 | 2 |
| | | retainability | % | 21 | 9 | 87 | 8 |
| | apparent molecular weight | before wet heat treatment | — | 20600 | 20700 | 23800 | 20500 |
| | | after wet heat treatment | | 18000 | 16000 | 23400 | 16200 |
| | | retainability | % | 87 | 77 | 98 | 79 |
| | flame retardancy | (before wet heat treatment) | 1.6 mm thick | V-0 | V-0 | Not-V | V-0 |

What is claimed is:

1. A polycarbonate resin composition which comprises:
(A) 40 to 92 wt % of an aromatic polycarbonate resin (component "a");
(B) 5 to 40 wt % of a styrene-based resin (component "b");
(C) 3 to 20 wt % of a phosphate-based flame retardant (component "c"); and
(D) 0.1 to 30 parts by weight of a silicate filler (component "d") based on 100 parts by weight of the total of the components "a", "b" and "c",
(E) 0.1 to 2 parts by weight of polytetrafluoroethylene (component "e") having fibril formability based on 100 parts by weight of the total of the components "a", "b" and "c"; and
(F) 1 to 10 parts by weight of a (meth)acrylate-based core-shell graft copolymer (component "f") based on 100 parts by weight of the total of the components "a", "b" and "c", wherein the component f-1 is selected from the group (i) a (meth) acrylate-based core-shell graft copolymer (f-1-i) consisting of 40 to 90 wt % of core made from a rubber consisting of 60 to 100 wt % of butadiene and 0 to 40 wt % of styrene and 10 to 60 wt % of a shell made from a polymer or copolymer comprising one or more monomers selected from an acrylic ester, methacrylic ester, aromatic vinyl compound and vinyl cyanide compound and (ii) a (meth) acrylate-based core-shell graft copolymer (f-1-ii) consisting of 40 to 90 wt % of core made from a copolymer rubber consisting of 60 to 90 wt % of an acrylic ester and 10 to 40 wt % of butadiene and 10 to 60 wt % of a shell made from a polymer or copolymer comprising one or more monomers selected from an acrylic ester, methacrylic ester, aromatic vinyl compound and vinyl cyanide compound,
and which has a chlorine compound content in terms of chlorine atoms of 100 ppm or less.

2. The resin composition of claim 1, wherein the component "a" is an aromatic polycarbonate resin obtained by interfacial polymerization.

3. The resin composition of claim 1, wherein the component "b" is a styrene-based resin containing acrylonitrile as a monomer constituent unit and the resin composition has an acrylonitrile monomer content of 50 ppm or less.

4. The resin composition of claim 1, wherein the component "b" is a styrene-based resin which contains 20 wt % or more of a styrene-based monomer unit out of all the monomer constituent units.

5. The resin composition of claim 4, wherein the styrene-based monomer unit is a styrene unit, α-methylstyrene unit or vinyltoluene unit.

6. The resin composition of claim 1, wherein the component "b" is polystyrene, high-impact polystyrene (HIPS), acrylonitrile.styrene copolymer (AS resin) or acrylonitrile-butadiene-styrene copolymer (ABS resin).

7. The resin composition of claim 1, wherein the component "b " is an acrylonitrile.butadiene.styrene copolymer (ABS resin).

8. The resin composition of claim 1, wherein the component "b" is an acrylonitrile.butadiene.styrene copolymer (ABS resin) obtained by bulk polymerization.

9. The resin composition of claim 1, wherein the component "c" is a phosphate-based flame retardant represented by the following formula (1):

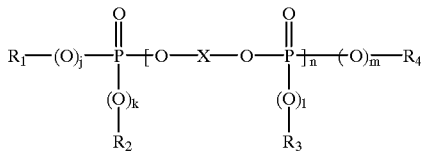

wherein X is the residual group of an aromatic dihydroxy compound, j, k, l and m are each independently 0 or 1, n is 0 or an integer of 1 to 5, and $R_1$, $R_2$, $R_3$ and $R_4$ are each independently the residual group of an aromatic monohydroxy compound.

10. The resin composition of claim 1, wherein the component "d" is a silicate filler which contains a $SiO_2$ component in an amount of 35 wt % or more.

11. The resin composition of claim 1, wherein the component "d" is talc, mica or wollastonite.

12. The resin composition of claim 1 which comprises 50 to 88 wt % of the component "a", 7 to 35 wt % of the component "b", 5 to 15 wt % of the component "c" and 0.5 to 20 parts by weight of the component "d" based on 100 parts by weight of the total of the components "a", "b" and "c".

13. The resin composition of claim 1, wherein the content of a chlorine compound is 90 ppm or less based on the resin composition in terms of chlorine atoms.

14. The resin composition of claim 3, wherein the content of an acrylonitrile monomer is 40 ppm or less based on the resin composition.

15. The resin composition of claim 1, wherein the component "f-1" is a (meth) acrylate-based core-shell graft copolymer consisting of 40 to 90 wt % of a core made from a rubber consisting of 60 to 100 wt % of butadiene and 0 to 40 wt % of styrene and 10 to 60 wt % of a shell made from a polymer or copolymer of one or more monomers selected from an acrylic ester, methacrylic ester, aromatic vinyl compound and vinyl cyanide compound.

16. The resin composition of claim 1, wherein the component "f-1" is a (meth)acrylate-based core-shell graft copolymer which consists of 40 to 90 wt % of a core made from a copolymer rubber consisting of an acrylic ester and 10 to 40 wt % of butadiene and 10 to 60 wt % of a shell formed by graft polymerizing at least one selected from an acrylic ester, methacrylic ester, aromatic vinyl compound and vinyl cyanide compound.

17. The resin composition of claim 1, wherein the component "f-1" is a (meth)acrylate-based core-shell graft copolymer which consists of 50 to 70 wt % of a core made from a rubber latex consisting of 60 to 80 wt % of an acrylic ester and 20 to 40 wt % of butadiene and 30 to 50 wt % of a shell formed by graft polymerizing a mixture of an aromatic vinyl compound and a methacrylic ester and optionally a vinyl cyanide compound in two stages based on 100 wt % of the total of the core and the shell, the amount of the methacrylic ester is 55 to 70 wt % based on 100 wt % of the shell, the amount of the vinyl cyanide compound is 22 to 30 wt % based on 100 wt % of the total of the vinyl cyanide compound and the aromatic vinyl compound when the vinyl cyanide compound is contained, a first graft component is either a mixture of an aromatic vinyl compound and a methacrylic ester or a mixture of an aromatic vinyl compound, a vinyl cyanide compound and a methacrylic ester, a second graft component is a methacrylic ester, the first graft component is contained in an amount of 42 to 70 wt %, and the second graft component is contained in an amount of 30 to 58 wt % based on 100 wt % of the total of shell components.

18. The resin composition of claim 1 which comprises 50 to 88 wt % of the component "a", 7 to 35 wt % of the component "b", 5 to 15 wt % of the component "c", and 0.5 to 20 parts by weight of the component "d", 0.1 to 1 part by weight of the component "e" and 2 to 8 parts by weight of the component "f-1" based on 100 parts by weight of the total of the components "a", "b" and "c".

19. A molded article of the resin composition of claim 1.

20. The molded article of claim 19 which attains V-O rating in an UL standard 94V flammability test.

21. The molded article of claim 19 which has an impact resistance retainability of 50% or more when it is stored at a temperature of 65° C. and a relative humidity of 85% for 500 hours and an apparent molecular weight retainability of 80% or more.

* * * * *

UNITED STATES PATENT AND TRADEMARK OFFICE
CERTIFICATE OF CORRECTION

PATENT NO.     : 6,403,683 B1
DATED          : June 11, 2002
INVENTOR(S)    : Hiroaki Kobayashi It is certified that error appears in the above-identified patent and that said Letters Patent is hereby corrected as shown below:

<u>Column 29,</u>
Line 38, delete "which comprises", insert -- consisting essentially of --

Signed and Sealed this

Twenty-ninth Day of October, 2002

Attest:

Attesting Officer

JAMES E. ROGAN
*Director of the United States Patent and Trademark Office*